(12) United States Patent
Jargowsky et al.

(10) Patent No.: US 7,431,315 B2
(45) Date of Patent: Oct. 7, 2008

(54) VEHICLE SUSPENSION SYSTEM WITH WHEEL SUPPORT KNUCKLE AND TRAILING ARM ATTACHED TO TOE LINK

(75) Inventors: Peter Jargowsky, Canton, MI (US); Jaspal Sohal, Canton, MI (US); Greg Gombert, Dearborn, MI (US); Oskar Rozalski, Canton, MI (US); Chris Allard, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 11/160,808

(22) Filed: Jul. 11, 2005

(65) Prior Publication Data
US 2007/0007741 A1  Jan. 11, 2007

(51) Int. Cl.
  *B60G 3/12* (2006.01)
  *B60G 7/00* (2006.01)
(52) U.S. Cl. .................. 280/124.128; 280/124.135
(58) Field of Classification Search .......... 280/124.125, 280/124.128, 124.129–124.131, 124.133, 280/124.135, 124.151–124.153
See application file for complete search history.

(56) References Cited

U.S. PATENT DOCUMENTS

| | | | | |
|---|---|---|---|---|
| 4,690,426 A | * | 9/1987 | Kubo et al. | 280/124.131 |
| 4,709,935 A | | 12/1987 | Takiazawa et al. | |
| 4,717,171 A | * | 1/1988 | Kami et al. | 280/834 |
| 4,754,992 A | * | 7/1988 | Asanuma | 280/124.143 |
| 4,790,560 A | * | 12/1988 | Asanuma et al. | 280/124.128 |
| 4,815,755 A | * | 3/1989 | Takata et al. | 280/124.128 |
| 4,832,363 A | * | 5/1989 | Mitobe | 280/124.128 |
| 5,340,146 A | * | 8/1994 | Kato | 280/124.143 |
| 6,530,587 B2 | | 3/2003 | Lawson et al. | |
| 6,672,605 B2 | | 1/2004 | Basnett | |
| 6,843,492 B2 | | 1/2005 | Inoue et al. | |
| 2003/0030241 A1 | | 2/2003 | Lawson | |
| 2004/0046347 A1 | | 3/2004 | Lee | |
| 2004/0046349 A1 | | 3/2004 | Ackley et al. | |
| 2005/0029770 A1 | | 2/2005 | Kim | |

FOREIGN PATENT DOCUMENTS

| | | |
|---|---|---|
| EP | 1 216 858 A2 | 6/2002 |
| GB | 2 147 553 A | 5/1985 |
| JP | 02-038107 | 7/1990 |

* cited by examiner

*Primary Examiner*—Ruth Ilan
(74) *Attorney, Agent, or Firm*—Frederick Owens; Brooks Kushman P.C.

(57) ABSTRACT

A wheel support knuckle and trailing arm assembly that is attached to a toe link of a vehicle suspension system. The trailing arm assembly is formed by a blade member and a reinforcement member. The wheel support knuckle defines an axle bore and includes an integrally formed upper link receptacle and an integrally formed brake caliper track. The toe link is retained on the trailing arm assembly by a clevis formed by a transverse wall formed in the blade member and a parallel transverse wall formed in the reinforcement member. An alternative embodiment discloses a one-piece trailing arm that defines a clevis for connection to the toe link between a transverse wall and a tab that extends parallel to the transverse wall. A method of making cast wheel support knuckle and stamped trailing arm assembly is also disclosed.

14 Claims, 2 Drawing Sheets

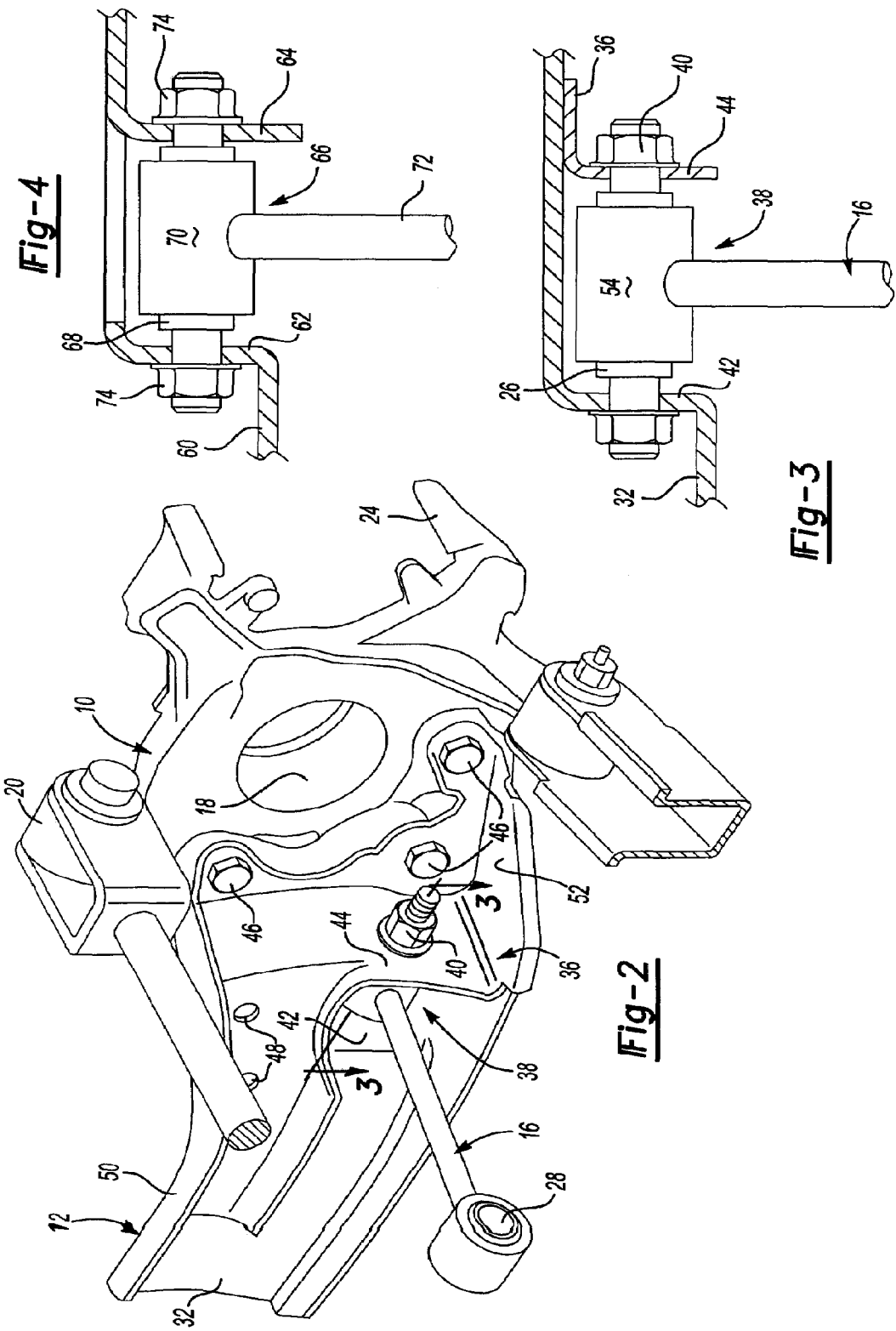

VEHICLE SUSPENSION SYSTEM WITH WHEEL SUPPORT KNUCKLE AND TRAILING ARM ATTACHED TO TOE LINK

BACKGROUND OF THE INVENTION

1. Field of the Invention

The present invention relates to trailing arm type suspension systems for vehicles.

2. Background Art

Vehicle suspension systems generally include a plurality of links between the frame of the vehicle and a wheel support knuckle. The wheel support knuckle is connected to the frame of the vehicle by upper and lower control arms, or links, that form an articulated linkage. The linkage allows the vehicle to move relative to the wheel in a controlled manner. Shock absorbers and springs are provided to absorb impacts and provide a smooth ride. Other links that connect the wheel support knuckle to the vehicle include camber links and toe links that provide for adjustment of the wheel position.

Suspension systems are designed to provide the desired ride and handling characteristics for a particular vehicle. For example, sports cars are generally provided with tight suspensions to improve handling. On the other hand, luxury cars are provided with suspensions that are tuned to provide a softer ride with somewhat reduced handling performance.

Traditional trailing arm designs having a cast knuckle generally require the toe link to be secured to the cast knuckle. Complex knuckle assemblies are relatively expensive to produce and increase the weight of the entire suspension system. Each bearing, or receptacle, incorporated in a wheel support knuckle increases the complexity and cost to manufacture the vehicle suspension system because more machining is required.

In some suspension systems, it may be advantageous to provide an integrated caliper track to which a disk brake caliper may be mounted on a cast knuckle. Providing a cast knuckle with brake and hub/rotor receptacles is an advantage that is not readily achieved by prior art stamped trailing arm and wheel support knuckle designs.

There is a need for a method of making a hybrid stamped and cast trailing arm and wheel support knuckle for vehicle suspension systems that reduces system weight and cost. Any such solution must be durable and should be sufficiently robust to withstand stresses encountered by SUV or off-road vehicles. In addition, there is a need for a hybrid trailing arm/wheel support knuckle that can accommodate an integrated caliper for vehicle brake systems.

These and other problems and needs are addressed by Applicants' invention as summarized below.

SUMMARY OF THE INVENTION

According to one aspect of the present invention, a suspension system for a vehicle having a frame and wheel upon which the vehicle is suspended relative to the frame is provided. The suspension system comprises a wheel support knuckle to which the wheels of the vehicle are attached. The knuckle has a lower control arm receptacle and an upper link receptacle that are integrally formed as part of the knuckle. An upper link is connected to the upper link receptacle and a lower control arm is connected to the lower control arm receptacle. The upper link and lower control arm are connected to the frame and extend in a generally transverse direction between the knuckle and the frame. A trailing arm extends from a location on the frame forward of the knuckle to the knuckle. The trailing arm has a blade member that is secured to the knuckle that defines, at least in part, a bushing mount. A toe link is secured between the frame and the bushing mount on the trailing arm.

An alternative embodiment of the invention is directed to a suspension system for a vehicle that includes a trailing arm formed by a blade member and a reinforcement member. The trailing arm is attached to a wheel support knuckle. The wheel support knuckle is connected by a plurality of generally transversely extending links that connect the knuckle to the frame. The trailing arm extends from a location on the frame forward of the knuckle to the knuckle. The blade member and the reinforcement member are secured together to reinforce an edge of the trailing arm that is secured to the knuckle. The blade member and reinforcement member together define a clevis. The toe link is secured between the frame and the clevis defined by the blade member reinforcement member of the trailing arm.

According to other aspects of the suspension system that may apply to either of the above embodiments, the knuckle may be formed by a metal casting process. The blade member is formed by a sheet metal forming process. If the trailing arm includes a reinforcement member, the reinforcement member may also be formed by a sheet metal forming process. The bushing mount may be a clevis as formed by first and second spaced apart surfaces formed on the blade member that are at least in part parallel to each other. If a reinforcement member is secured to the blade member, the clevis may be formed by a first wall of the blade member and a second wall of the reinforcement member that are spaced apart and at least in part substantially parallel to each other.

According to other aspects of the invention, the blade member is an elongated member having a peripheral flange extending around a portion of the outer periphery of the blade member forming a shallow cup-shaped member. The shape of the blade could be modified to eliminate the flange and have reinforcing ribs, or the like. The blade member is adapted to be secured to the knuckle by fasteners. If a reinforcement member is provided, the reinforcement member may have an edge flange that is adapted to nest within the peripheral flange of the blade member. The blade member and reinforcement member may be secured together in a mounting flange area that receives a set of fasteners that extend through holes in the reinforcement member, blade member, and the knuckle.

According to another aspect of the present invention, a method of making a wheel support knuckle on a trailing arm for a vehicle suspension system is provided. The method comprises casting the wheel support knuckle and forming a blade member and reinforcement member in a sheet metal forming process. The blade member and reinforcement member define first and second halves of a clevis mounting area. The reinforcement member is welded to the blade member to form a clevis by aligning the first and second halves of the clevis mounting area in a spaced apart face-to-face relationship. The blade member and reinforcement member are assembled together into the wheel support knuckle with a plurality of fasteners.

According to other aspects of the method of the invention summarized above, the step of casting the wheel support knuckle may further comprise forming an integrated caliper rail on the knuckle for receiving a disc brake caliper. The steps of forming the blade and reinforcement members may further comprise forming a peripheral flange on the blade member that extends at least partially perpendicularly relative to a body portion of the blade member and also forming an edge flange on the reinforcement member. The edge flange is nested within the peripheral flange of the blade member prior to the welding step.

The above and other aspects of the present invention will be better understood in view of the attached drawings and following detailed description of the illustrated embodiments of the invention.

BRIEF DESCRIPTION OF THE DRAWINGS

FIG. 2 is an inside fragmentary perspective view thereof;

FIG. 3 is a cross-sectional view taken along the line 3-3 in FIG. 2; and

FIG. 4 is a cross-sectional view similar to FIG. 3 of an alternative embodiment of a toe link connection to a trailing arm.

DETAILED DESCRIPTION OF THE PREFERRED EMBODIMENT(S)

Figure 1:
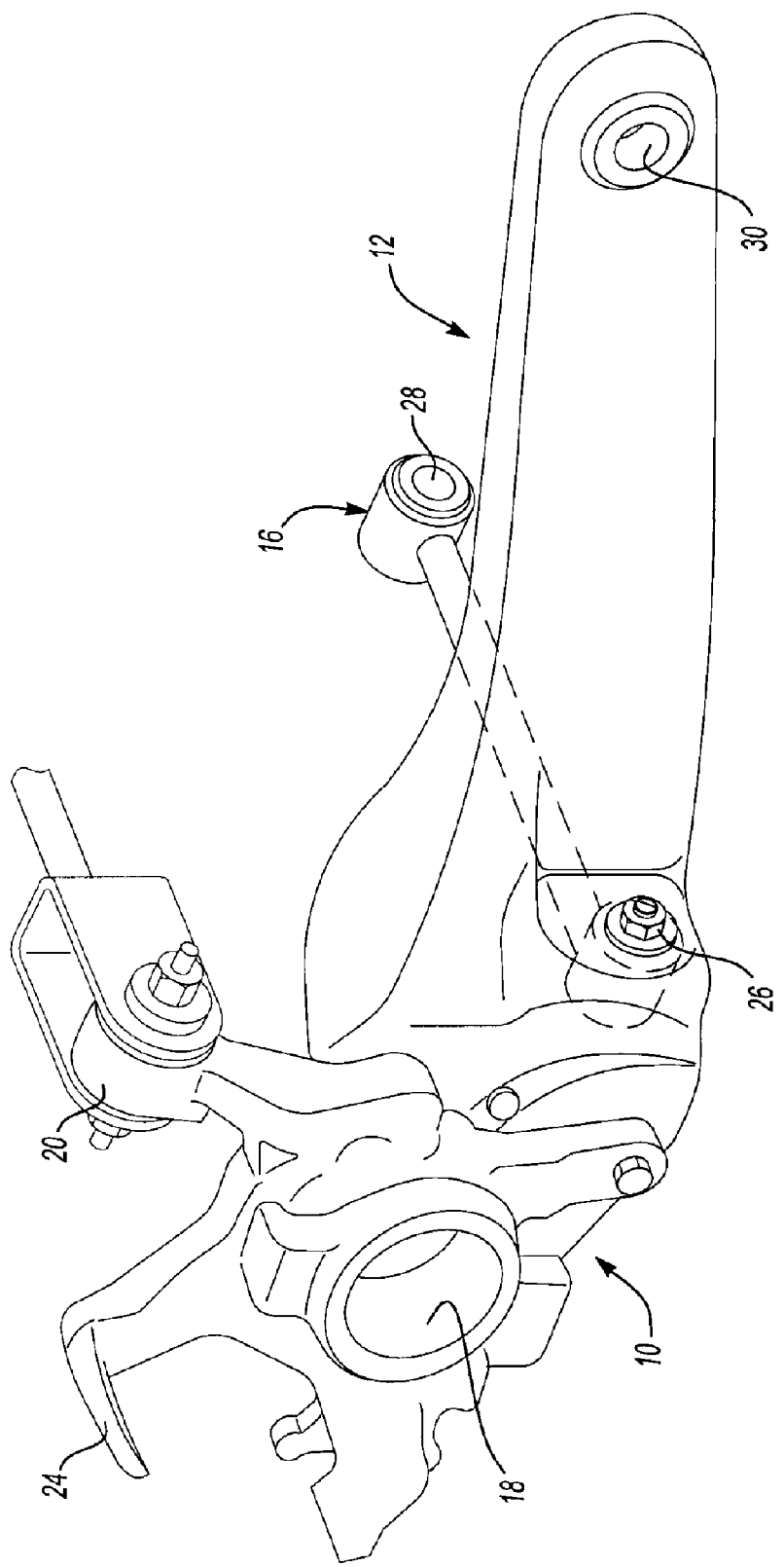
FIG. 1 is a perspective view of a portion of a vehicle suspension system including a wheel support knuckle, trailing arm and toe link.

Referring to FIG. 1, a wheel support knuckle 10 is shown in conjunction with a trailing arm assembly 12 and toe link 16 of a vehicle suspension system. An axle (not shown) extends to the wheel support knuckle 10 that defines an axle bore 18 for a wheel bearing. The wheel support knuckle 10 includes an upper control arm receptacle 20. A caliper track 24 is integrally cast on the knuckle 10 to provide a simple and cost effective way to mount a brake caliper for a disc brake system on the knuckle 10. The toe link 16 includes an outboard toe link bushing 26 and an inboard toe link bushing 28. The outboard toe link bushing 26 connects the toe link 16 to the trailing arm assembly 12. The inboard toe link bushing 28 connects the toe link 16 to a bracket on the frame rail (not shown) of the vehicle.

Referring to FIGS. 1 and 2, the trailing arm assembly 12 includes a forward trailing arm bushing 30 that is located near the forward end of the trailing arm assembly 12. A blade member 32 is formed in a sheet metal forming process. Reinforcement member 36 is also formed in a sheet metal forming process. A clevis 38 is defined by the blade member 32 and reinforcement member 36 through which a fastener 40 is inserted to connect the toe link 16 to the trailing arm assembly 12. The fastener 40 extends through the outboard toe link bushing 26 and transverse walls 42 and 44. Transverse wall 42 is formed as part of the blade member 32. Transverse wall 44 is formed as part of the reinforcement member 36. The trailing arm assembly 12 is secured by a plurality of bolts 46 to the wheel support knuckle 10. The blade member 32 and reinforcement member 36 may be welded together, or alternatively, may be secured by fasteners.

The blade member 32 includes a peripheral flange 50 that extends around a substantial portion of the periphery of the blade member 32. An edge flange 52 is formed on the reinforcement member 36. The edge flange 52 is configured to nest within the peripheral flange 50 of the blade member 32. The peripheral flange 50 and edge flange 52 may be welded together to form the trailing arm assembly 12.

Referring to FIG. 3, the connection of the toe link 16 to the blade member 32 and reinforcement member 36 is illustrated in greater detail. The toe link 16 has an end tube 54 that is disposed within the clevis 38. The clevis 38 is defined between transverse wall 42 of the blade member 32 and transverse wall 44 of reinforcement member 36. A fastener 40, such as a bolt, is inserted through the transverse walls 42, 44 and end tube 54. The end tube 54 supports the outboard toe link bushing 26 that provides a resilient coupling between toe link 16 and the trailing arm assembly 12.

Referring to FIG. 4, an alternative embodiment of the present invention is shown in which a one-piece trailing arm 60 is provided that may be manufactured from heavier gauge sheet stock material. The one-piece trailing arm 60 has a transverse wall 62 and a partially severed tab 64 that extend generally parallel to each other and are formed in the trailing arm 60. A clevis 66 is defined between the transverse wall 62 and the tab 64. A bushing 68 is used to resiliently secure the end tube 70 of a toe link 72 by means of a fastener 74.

While the best mode for carrying out the invention has been described in detail, those familiar with the art to which this invention relates will recognize various alternative designs and embodiments for practicing the invention as defined by the following claims.

What is claimed is:

1. A suspension system for a vehicle having a frame and wheels upon which the vehicle is suspended relative to the frame, the suspension system comprising:

a wheel support knuckle to which one of the wheels of the vehicle are attached, a lower control arm bushing and an upper link bushing are attached to the knuckle;

an upper link is connected to the upper link bushing, a lower control arm is connected to the lower control arm bushing, wherein the upper link and the lower control arm are connected to the frame and extend in a generally transverse direction between the knuckle and the frame;

a trailing arm extends in a generally longitudinal direction from a location on the frame forward of the knuckle to the knuckle, the trailing arm having a blade member that is secured to the knuckle, a reinforcement member is attached to the blade, wherein the blade member and the reinforcement member define a clevis mount; and a toe link secured between the frame and the clevis mount.

2. The suspension system of claim 1 wherein the knuckle is formed by a metal casting process.

3. The suspension system of claim 1 wherein the blade member is formed by a sheet metal forming process.

4. The suspension system of claim 1 wherein the clevis mount is formed by first and second spaced apart surfaces on the blade member that are at least in part parallel to each other.

5. The suspension system of claim 4 wherein an outboard bushing secures an outboard end of the toe link to the clevis and an inboard bushing secures the inboard end of the toe link to the frame of the vehicle.

6. The suspension system of claim 1 wherein the blade member is elongated and has a peripheral flange extending around a portion of the outer periphery thereof to form a shallow channel-shaped member.

7. The suspension system of claim 1 wherein the blade member has at least two holes in a common mounting flange area that is secured to a corresponding set of holes in the knuckle by at least two fasteners.

8. A suspension system for a vehicle having a frame and wheels upon which the vehicle is suspended relative to the frame, the suspension system comprising:

a wheel support knuckle to which the wheels of the vehicle are attached;

a plurality of links that connect the knuckle to the frame and extend in a generally transverse direction between the knuckle and the frame;

a trailing arm extending from a location on the frame forward of the knuckle to the knuckle, the trailing arm having a blade member and a reinforcement member that are secured together to reinforce an edge of the trailing arm that is secured to the knuckle, the blade member and reinforcement member together defining a clevis; and a toe link secured between the frame and the clevis defined by the blade member and reinforcement member of the trailing arm.

9. The suspension system of claim 8 wherein the knuckle is formed by a metal casting process.

10. The suspension system of claim 8 wherein the blade member and reinforcement member are formed by a sheet metal forming process.

11. The suspension system of claim 8 wherein the clevis is formed by a first wall of the blade member and a second wall of the reinforcement member that are spaced apart and at least in part parallel to each other.

12. The suspension system of claim 8 wherein an outboard bushing secures an outboard end of the toe link to the clevis and an inboard bushing secures an inboard end of the toe link to the frame of the vehicle.

13. The suspension system of claim 8 wherein the blade member is elongated and has a peripheral flange extending around a portion of the outer periphery thereof to form a shallow cup shaped member and wherein the reinforcement member has at least one edge flange that nests within peripheral flange of the blade member.

14. The suspension system of claim 8 wherein the blade member and the reinforcement member each have at least two holes in a common mounting flange area that is secured to a corresponding set of holes in the knuckle by at least two fasteners.

* * * * *